(12) United States Patent
Conversano et al.

(10) Patent No.: US 11,482,395 B2
(45) Date of Patent: Oct. 25, 2022

(54) HEATERLESS HOLLOW CATHODE

(71) Applicant: California Institute of Technology, Pasadena, CA (US)

(72) Inventors: Ryan W. Conversano, Pasadena, CA (US); Dan M. Goebel, Pasadena, CA (US); Giulia Becatti, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 36 days.

(21) Appl. No.: 17/104,773

(22) Filed: Nov. 25, 2020

(65) Prior Publication Data

US 2021/0175044 A1    Jun. 10, 2021

Related U.S. Application Data

(60) Provisional application No. 62/944,616, filed on Dec. 6, 2019.

(51) Int. Cl.
  *H01J 29/86* (2006.01)
  *H01J 29/04* (2006.01)
  *B64G 1/40* (2006.01)

(52) U.S. Cl.
  CPC ............ *H01J 29/861* (2013.01); *B64G 1/405* (2013.01); *H01J 29/04* (2013.01)

(58) Field of Classification Search
  None
  See application file for complete search history.

(56) References Cited

U.S. PATENT DOCUMENTS

| | | | | |
|---|---|---|---|---|
| 6,140,773 A * | 10/2000 | Anders | ............. | H01J 37/32009 315/111.21 |
| 6,388,381 B2 * | 5/2002 | Anders | .................... | H05H 1/48 219/121.52 |
| 10,723,489 B2 | 7/2020 | Conversano et al. | | |

OTHER PUBLICATIONS

Conversano R. et al., "Developmentand Initial PerformanceTesting ofa Low-Power Magnetically Shielded Hall Thrusterwith an Internally-Mounted Ho How Cathode" *35th International Electric Propulsion Conference*,2017.
Goebel D. et al., "Fundamentals of Electric Propulsion: Ion and Hall Thrusters" John Wiley & Sons, Inc,2008.

(Continued)

*Primary Examiner* — Ashok Patel
(74) *Attorney, Agent, or Firm* — Steinfl + Bruno, LLP

(57) ABSTRACT

Systems and methods for providing a heaterless hollow cathode for use in electric propulsion devices is presented. According to one aspect the cathode includes a thermionic emitter having a constricted upstream inlet compared to a downstream outlet of the emitter. The emitter is arranged downstream a hollow cathode tube. Constriction of the upstream inlet is provided by an inner cylindrical hollow space at an upstream region of the emitter having a diameter that is smaller compared to a diameter of an inner cylindrical hollow space at a downstream region of the emitter. A hollow transition region having a varying diameter connects the upstream region to the downstream region. According to another aspect, a ratio of the diameters of the two cylindrical hollow spaces reduces penetration of electric field, and therefore of electric discharge, into the upstream region of the emitter during operation.

22 Claims, 7 Drawing Sheets

(56) References Cited

OTHER PUBLICATIONS

Grubisic A. et al., "On-a-Chip Microdischarge Thruster Arrays Inspired by Photonic Device Technology for Plasma Television" ESA Feasibility Study, 2009.
Becatti G. et al., "Demonstration of 25,000 ignitions on a proto-flight compact Heaterless lanthanumhexaboridehollowcathode" Acta Astronautica, vol. 178, pp. 181-191, Sep. 2020.
Conversano R. et al., "Overview of the Ascendant Sub-kW Transcelestial Electric Propulsion System (ASTRAEUS)" *36th International Electric Propulsion Conference*, 2019.
Cranny A. et al., "On-a-chip microdischarge thruster arrays inspired by photonic device technology for plasma television—Final Report" European Space Agency, May 2009, 93 pages.
Hofer R. et al., "Magnetic shielding of a laboratory Hall thruster. II. Experiments" *Journal of Applied Physics*, vol. 115, 2014.
Lev D. et al., "Heaterless Hollow Cathode Characterization and 1,500 hr Wear Test" *52nd AIAA/SAE/ASEE Joint Propulsion Conferences*, 2016.
Lev D. "Heaterless Hollow Cathode Technology—A Critical Review" Space Propulsion Conference, May 2016, 12 pages.
Lev D. "Low current Heaterless hollow cathode neutralizer for plasma propulsion—Development overview" Rev. Sci. Instrum, Nov. 2019, 13 pages.
Lord P. et al., "Psyche : Journey to a Metal World" *IEEE Aerospace Conference*, 2017.
Mikellides I. G. et al., "Magnetic shielding of a laboratory Hall thruster. I. Theory and validation" *Journal of Applied Physics*, vol. 115, 2014.
Vekselman V. et al., "Characterization of a Heaterless Hollow Cathode" Journal of Propulsion and Power, vol. 29, 2013, pp. 475-486.
Zhang H. et al., "High-Speed Camera Imaging of the Ignition Process in a Heaterless Hollow Cathode" IEEE Transactions on Plasma Science, 2019.

\* cited by examiner

HEATERLESS HOLLOW CATHODE

CROSS REFERENCE TO RELATED APPLICATIONS

The present application claims priority to and the benefit of U.S. provisional patent application Ser. No. 62/944,616 entitled "Heaterless Hollow Cathode with Fast, Repeatable Discharge Ignition", filed on Dec. 6, 2019, the disclosure of which is incorporated herein by reference in its entirety.

STATEMENT OF GOVERNMENT GRANT

This invention was made with government support under Grant No. 80NM0018D004 awarded by NASA (JPL). The government has certain rights in the invention.

TECHNICAL FIELD

The present disclosure relates to electric propulsion devices. More particularly, it relates to a heaterless hollow cathode to produce required electrons for operation of such devices with fast and repeatable discharge ignition. Applications can include any electric propulsion device, including (but not limited to) gridded ion thrusters or Hall thrusters.

BACKGROUND

An electron source is a critical component of electric propulsion (EP) devices, including gridded ion and Hall thrusters. These thrusters use hollow cathodes, such as the hollow cathode (100) shown in FIG. 1, to produce the required electrons via an enclosed thermionic emitter (a.k.a. insert, cathode insert, cathode emitter) that once elevated to a temperature, generally in the range of 1200-1500° C. (Celsius), produces sufficient electron current to operate the EP thruster.

The term "hollow" derives from the geometry of the cathode which, as shown in the prior art cathode (100) of FIG. 1, includes a cathode tube (labelled in the FIG. 1 as Cathode Tube) that is cylindrical (e.g., tubular) in shape with an internal hollow space within which a hollow cylindrical thermionic emitter (labelled in FIG. 1 as Insert) is fitted. Conventionally, an external heater (labelled in FIG. 1 as Heater) is wrapped around the outside of the cathode tube and used to start thermionic emission of the emitter. As used herein, the term "cathode", or "hollow cathode", may refer to the combination of the cathode tube, the emitter, the heater and the optional orifice plate (labelled in FIG. 1 as Orifice Plate). As used herein, the term "heaterless cathode" refers to a cathode that does not include a heater or heating element (as known in the art).

As can be seen in FIG. 1, the insert of the prior art cathode is also cylindrical in shape with an outside diameter that is substantially equal to the constant inside diameter provided by the internal hollow space of the cathode tube, which allows a slip fit of the insert within the cathode tube. Likewise, the internal hollow space of the emitter is cylindrical in shape and therefore has a substantially constant diameter in the prior art cathode. As shown in FIG. 1, the emitter is positioned at a downstream side of the cathode such that one end of the emitter is at a vicinity of a downstream exit of the cathode. It should be noted that the exemplary prior art cathode (100) shown in FIG. 1 includes an optional ring (e.g., Moly ring, labelled in FIG. 1 as Ring) that in this particular implementation is brazed to the insert to provide an electrical attachment (e.g., tungsten insert, labelled in FIG. 1 as Electrical Attachment) intended for upstream electrical connection. In other words, the apparent small step at the upstream end of the insert of the prior art cathode (100) of FIG. 1 is not part of the insert geometry and does not actively participate in the thermionic emission process.

As shown in FIG. 1, the downstream exit of the cathode may include an (optional) orifice plate (labelled in FIG. 1 as Orifice Plate) having a center opening/orifice. The orifice plate may be fabricated as a separate part that is fixated to a downstream end of the cathode tube or may be fabricated as an integral part of the cathode tube with additional fabrication cost. It should be noted that in some implementations the orifice plate may not be present as the downstream exit may be the entirety of the downstream opening of the cathode tube. Teachings according to the present disclosure may equally apply to either implementations (with or without orifice plate).

As known to a person skilled in the art, the emitter may be fabricated with materials that can promote thermionic emission when heated. Common emitter materials with proven practicality include barium oxide impregnated porous tungsten (BaO—W) and lanthanum hexaboride ($LaB_6$). Traditionally, and as shown in FIG. 1, the prior art cathode (100) uses a coaxial heating element, Heater, wrapped around the outside of the cathode tube to raise the emitter to thermionic emission temperatures after which a plasma discharge can be initiated to an external anode (e.g., Anode shown in FIG. 2) or thruster plasma. Once started using the heater, the plasma discharge is "self-heating" due to the plasma resistance and discharge current, and it maintains sufficiently high emitter temperatures to produce the desired current. The external heater can then be turned off. Despite this occasional usage of the external heater element just to start the thermionic emission of the cathode (100), heater failures are problematic and have even resulted in the loss of electric thrusters in flight due to the inability to ignite the cathode (100).

There has been some recent development of heaterless hollow cathodes, most of which are small hollow cathodes (capable of only a few amperes) used in low-power (sub-kW) EP devices. FIG. 2 shows a simplified schematic of a prior art implementation of an EP device (200) including three electrodes: a heaterless hollow cathode, an anode and a keeper. As can be seen in FIG. 2, the heaterless hollow cathode of the EP device (200) is based on the prior art cathode of FIG. 1 but without the heating element. The EP device (200) further includes a keeper electrode (labelled in FIG. 2 as Keeper) and associated power supply (labelled in FIG. 2 as Keeper PS), and an anode electrode (labelled in FIG. 2 as Anode) and associated power supply (labelled in FIG. 2 as Anode PS). In other words, the heaterless hollow cathode used in the EP device (200) of FIG. 2 includes geometries according to the description above with reference to FIG. 1, including constant outer and inner diameters of the thermionic insert along the entirety of the longitudinal/axial extension of the insert.

As known to a person skilled in the art, all heaterless hollow cathodes, including one shown in FIG. 2, rely on the generation of an electrical breakdown known as a "Paschen breakdown" to both heat the cathode and ignite a discharge. In general, a Paschen (electrical) breakdown is a high voltage, low current discharge that is struck between the cathode orifice plate (e.g., shown in FIG. 1) and the keeper electrode at the downstream exit of the cathode.

The Paschen ignition process requires: a) a high voltage to be applied between the cathode and the keeper (e.g., via Keeper PS of FIG. 2, typically 500 to 2000 V), and b) a high gas flow (e.g., Propellant shown in FIG. 2) to be injected at an upstream entry into the cathode to increase the pressure in a gap region (labelled as Gap in FIG. 2) between the orifice plate and the keeper to a threshold level. In turn, application of the high voltage and the high gas flow cause occurrence of an electrical breakdown in the gap between the cathode and the keeper. Once the gap electrically breaks down, a plasma discharge in a region of the gap heats the orifice plate which in turn heats the thermionic insert of the cathode to thermionic emission temperatures. Once the thermionic insert is hot enough to emit electrons, the plasma discharge preferentially transitions from the exterior of the orifice plate to the inside of the hollow cathode and attaches to the insert (inner) surface. The discharge may then be connected to the anode by applying a positive electrical potential to the anode, after which the keeper PS may be turned off; normal hollow cathode operation to the anode is obtained.

Prior art heaterless cathodes, such as one shown in FIG. 2, may use very small keeper electrode orifice diameters to increase the pressure in the gap between the orifice plate and the keeper, thereby reducing the required amount of gas flow and voltage applied to induce the Paschen ignition. This leads to erosion and expansion of the keeper orifice with operation time (100's or 1,000's of hours) which may therefore impact reliability of the prior art heaterless cathode.

The benefits of a heaterless cathode are numerous, including relatively short cathode ignition times (generally 100's of ms to 1's of seconds), removal of the external cathode heater (which is considered an EP system single-point failure), and the elimination of the cathode heater power supply in the EP system's power processing unit (PPU). The key disadvantages of using a heaterless system are the high voltage and high gas flow rates required, necessitating a PPU that has a high voltage keeper power supply (e.g., Keeper PS of FIG. 2) to ignite and sustain the Paschen discharge until the thermionic emission starts and a xenon flow controller (XFC) capable of delivering flow rates on the order of 100× nominal during ignition. Furthermore, the Paschen discharge can easily transition into an arc discharge if the arc current is not well controlled, possibly creating significant damage to the cathode electrode.

The voltage at which a Paschen breakdown occurs is a function of the product of the local pressure (p, which is effectively the gas density) and the distance (e.g., d as shown in FIG. 2) between the cathode and keeper electrodes. An example of the Paschen breakdown voltage (Breakdown Voltage) versus this pressure-distance product (P.d) for different propellant gas is shown in FIG. 3. In particular, the different propellant gas may include pure Xenon, Krypton or Argon. The location of the Paschen breakdown in the cathode geometry depends on this pressure times distance (p*d) effect, and generally occurs near the minimum in the curves shown in FIG. 3. The breakdown is also highly dependent on the initial source of field emission electrons that start the Paschen breakdown. These electrons come from high voltage (high electric fields) on microscopic surface texture and surface morphology of the electrodes (e.g. small sharp features or unclean regions may generate electric field concentrations) and can cause a breakdown away from the normal p*d attachment point. Therefore, a key challenge in operating heaterless hollow cathodes is controlling both the p*d product location and the surface conditions.

Another challenge for heaterless hollow cathodes is to avoid transitioning the Paschen breakdown into a hard arc, where the discharge constricts to a very small area (the arc site) which may cause damage to the surface of the electrodes. Transition to an arc occurs when the total current exceeds what is called the "chopping current" or "sustaining current", which is a characteristic of the material properties (of the electrodes) and the total current. Typical chopping currents are between 1-2 A for most metals. Operation of the Paschen discharge above this current range for any time longer than a few microseconds will result in arcing and therefore damaging of the surface of the electrodes.

Inventors of the present disclosure have found that failure to control the breakdown location and (elimination of) the transition to arcing can result in: a) long ignition times (>>10 s); b) inconsistent ignition times (e.g. <50 ms on one ignition to >10 s on the following ignition); c) Paschen breakdown away from (and sometimes significantly upstream of) the emitter; and d) arc transition and significant damage to the cathode electrode.

Since Paschen breakdown depends on the product of the pressure times the distance, long path lengths tend to preferably breakdown. If the Paschen breakdown can connect/couple upstream of the cathode insert region, which is a longer distance than the cathode orifice plate to keeper gap, the plasma heating occurs in a location away from the insert and ignition may not be possible. The coupling of the Paschen breakdown to locations that are not to the cathode orifice plate or the emitter is a major concern as the local plasma generated by the Paschen breakdown can also cause significant damage to the cathode. Notably, it can sputter erode internal surfaces of the cathode which are not designed to withstand such erosion and/or heat regions of the cathode beyond their intended operating temperature range. Both of these can lead to potential failure of the prior art heaterless cathode assembly.

For example, FIG. 4 shows (a line drawing based on) a photograph of prior art heaterless cathode that is ignited with the Paschen discharge glowing downstream of the cathode (far left in the figure), the Paschen discharge being attached upstream of the insert of the cathode to a thin gas-feed line at the back of the cathode (on the right of FIG. 4 which is upstream of the cathode insert/emitter), resulting in over heating of the gas-feed line to red-hot temperatures. This attachment of the discharge at the back of the cathode (i.e., upstream of the cathode insert/emitter) is due to the design (e.g., geometry, shape) of the cathode that allows significant electric field penetration upstream of the emitter.

Inventors of the present disclosure have observed similar Paschen breakdown attachment upstream of the cathode emitter in other implementations of prior art heaterless hollow cathodes, including one implementation designed for a maximum discharge current of 4 A. The nominal ignition behavior in such implementation clearly showed the initial attachment/coupling of the Paschen discharge to the orifice plate of the cathode and rapid heating turn on of the thermionic discharge (in less than 1 second). However, occasionally the ignition took tens of seconds to transition to the anode, indicating poor insert heating due to attachment of the Paschen breakdown at the gas feed line in the back of the cathode upstream of the emitter. Likewise, heaterless ignition testing of yet other implementations of heaterless hollow cathodes designed for even higher maximum discharge currents (e.g., 30/50 A peak currents) showed the same long timescale heating and Paschen discharge attachment/coupling to the electrodes (gas line location) upstream of the emitter as shown in FIG. 4. Such variable heating time and unstable ignition behavior represents a significant risk to long-term use of the prior art heaterless cathodes, such as one shown in FIG. 2, and must be eliminated before they can be reliably used in space.

Teachings according to the present disclosure describe a heaterless hollow cathode which by way of its novel thermionic insert design overcomes the above described issues of the prior art heaterless hollow cathodes to provide fast and repeatable discharge ignition.

SUMMARY

According to a first aspect of the present disclosure, a heaterless hollow cathode is presented, the heaterless hollow cathode comprising: a cathode tube having an inner cylindrical hollow space; and a thermionic emitter arranged in the inner cylindrical hollow space of the cathode tube, the thermionic emitter comprising: a first inner cylindrical hollow space having a first diameter that defines an upstream inlet orifice of the thermionic emitter; and a second inner cylindrical hollow space having a second diameter that defines a downstream outlet orifice of the thermionic emitter; wherein the first diameter is smaller than the second diameter.

According to a second aspect of the present disclosure, a thermionic emitter is presented, the thermionic emitter comprising: a first inner cylindrical hollow space having a first diameter that defines an upstream inlet orifice of the thermionic emitter; a second inner cylindrical hollow space having a second diameter that defines a downstream outlet orifice of the thermionic emitter; and a transition inner hollow space arranged between the first inner cylindrical hollow space and the second inner cylindrical hollow space, wherein the first diameter is smaller than the second diameter, and a ratio of the first diameter to the second diameter is configured to reduce upstream penetration of electric fields when the thermionic emitter is used in a heaterless hollow cathode.

According to a third aspect of the present disclosure, a method for reducing penetration of electric discharge upstream of a heaterless hollow cathode is presented, the method comprising: providing a thermionic emitter having a constricted upstream inlet orifice compared to a downstream outlet orifice; fitting the thermionic insert into a cathode tube, thereby obtaining a heaterless hollow cathode; partially surrounding the heaterless hollow cathode with a keeper electrode; applying a potential difference between the heaterless hollow cathode and the keeper electrode; and based on the applying, generating an electric discharge that is confined to a downstream region of the heaterless hollow cathode, the electric discharge being a Paschen discharge.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure. Same reference designators refer to same features.

DETAILED DESCRIPTION

Time-dependent variation of any operating parameters on EP devices is undesirable for space applications, especially if they are not consistent. In the case of EP devices using the prior art heaterless hollow cathodes, as described above, inventors of the present disclosure have observed a transient inconsistent ignition behavior that could potentially lead to failure of the cathodes and/or EP devices.

Figure 4:
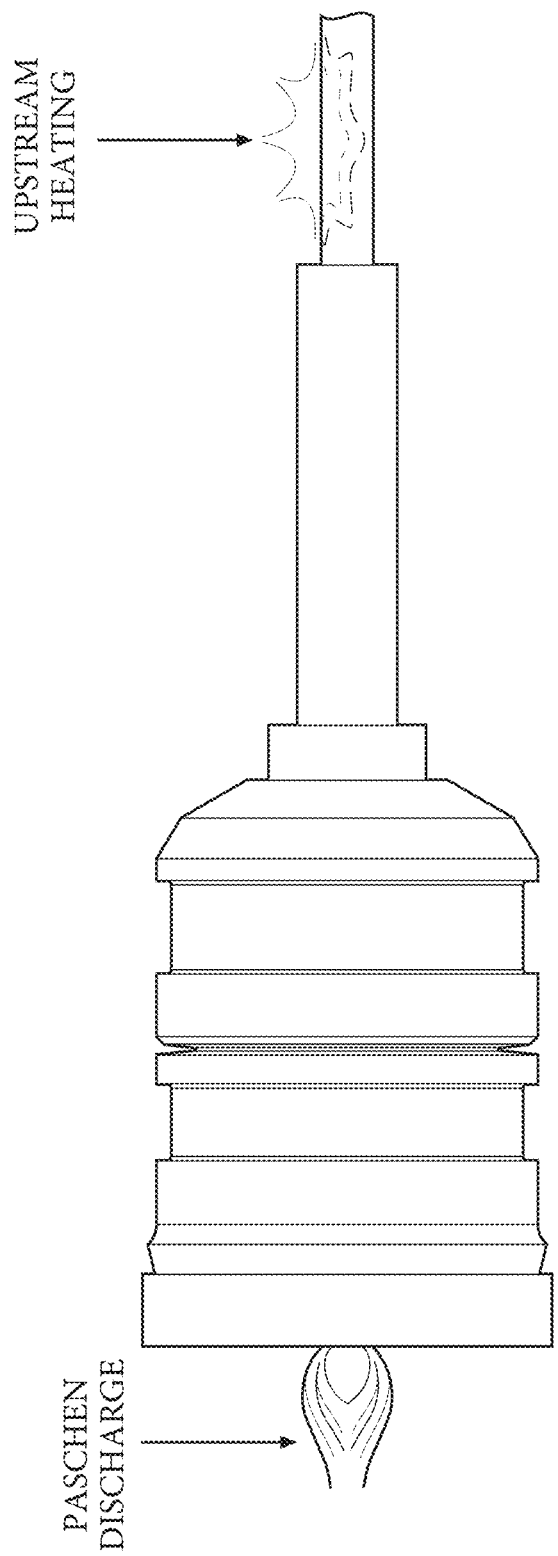
FIG. 4 shows a prior art heaterless hollow cathode ignited with a Paschen discharge that is coupled to a gas-feed line upstream an insert/emitter of the cathode.

Teaching according to the present disclosure provide a solution to the above problem by modifying the design of the thermionic emitter insert of the cathode to force the Paschen discharge to attach (connect/couple) to either the orifice plate of the cathode or the insert itself, and eliminate the possibility of attachment of the Paschen discharge upstream of the emitter, such as for example, to a gas-feed line per FIG. 4 described above. Teachings according to the present invention provide a cathode having a low heat capacity insert for fast ignition, and an electrode and insert geometry that forces the Paschen discharge to strike the orifice plate or the insert directly.

Figure 1:
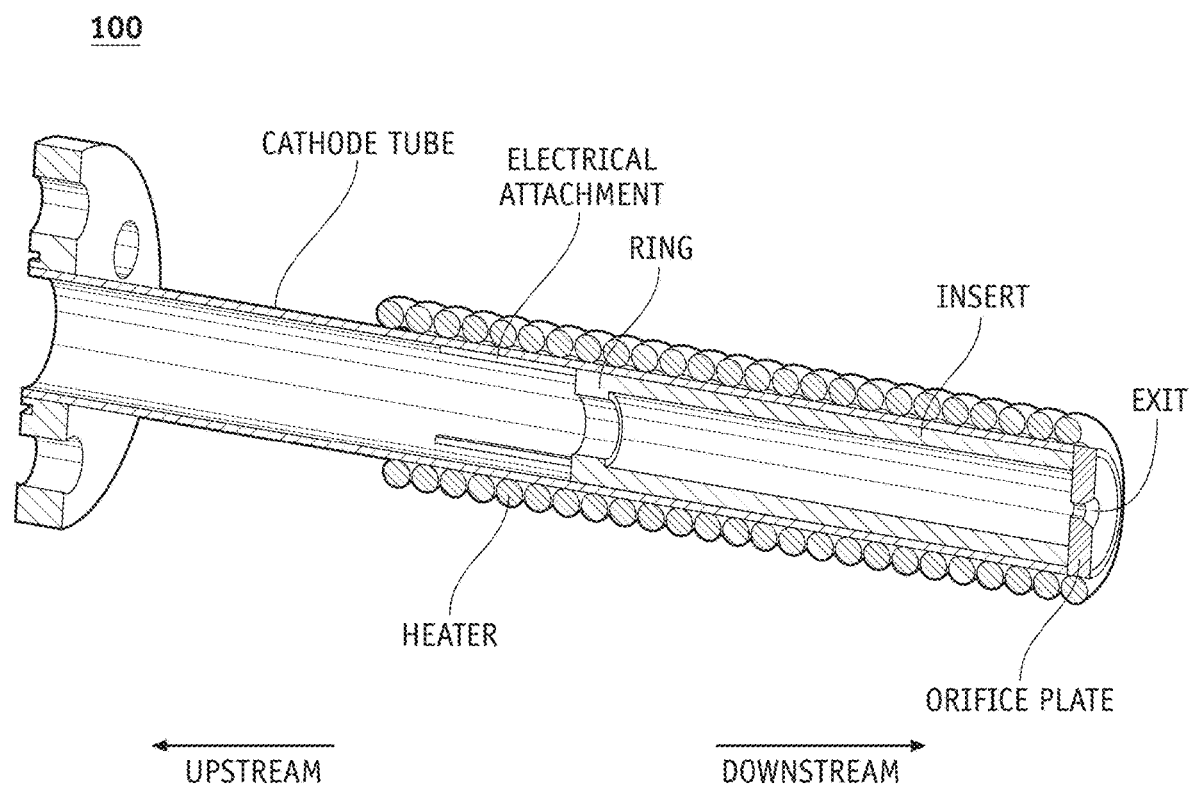
FIG. 1 shows a schematic of a prior art hollow cathode.
Figure 5A:
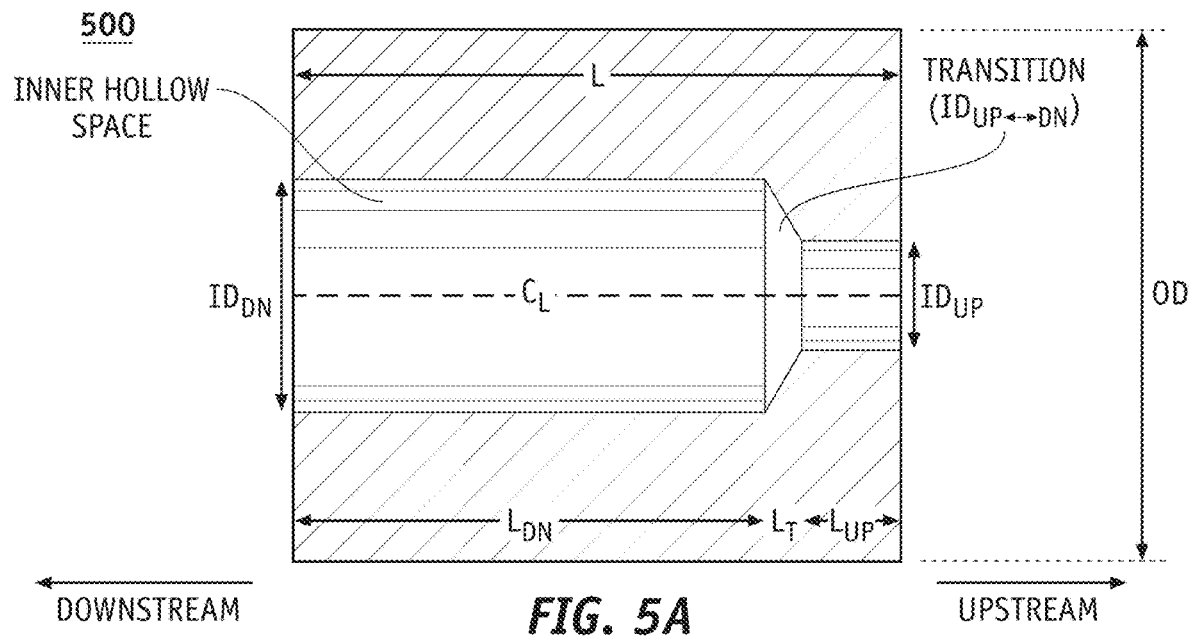
FIG. 5A shows a cross section of a thermionic (cathode) emitter for use in a heaterless hollow cathode according to an embodiment of the present disclosure.

FIG. 5A shows a cross section of a thermionic (cathode) emitter (500) for use in a heaterless hollow cathode according to an embodiment of the present disclosure. As can be seen in FIG. 5A the emitter (500) according to the present disclosure has a geometry that is different from the prior art emitter described above with reference to FIGS. 1-2. Such geometry allows elimination of the unfavorable behaviors of the prior art cathode, leading to no ignition inconsistencies over thousands of cathode ignitions. Tests of this geometry showed reproducible sub-1 second ignitions for over 25,000 cycles without any arc or discharge damage to the cathode.

Teachings according to the present disclosure redesign the upstream end (i.e. inlet) of the emitter with an axially long, small diameter orifice (labelled as $ID_{UP}$ in FIG. 5A) such that the electric fields driving the Paschen discharge cannot penetrate upstream. The new emitter geometry maintains the same overall dimensions, including the outer diameter (labelled as OD in FIG. 5A) and length (e.g., axial/longitudinal extension, labelled at L in FIG. 5A) of a cathode's original emitter (e.g., prior art configurations of FIGS. 1-2) so that the normal operation and emitter life (after ignition) is not affected. However, as shown in FIG. 5A, the emitter according to the present teachings employs a varying cross section of the inner hollow space having a smaller inner diameter (labelled as $ID_{UP}$ in FIG. 5A) at the upstream end (i.e. emitter inlet) of the emitter (500) and a larger inner diameter ($ID_{DN}$) at the downstream end (i.e. emitter outlet) of the emitter (500).

Figure 5B:
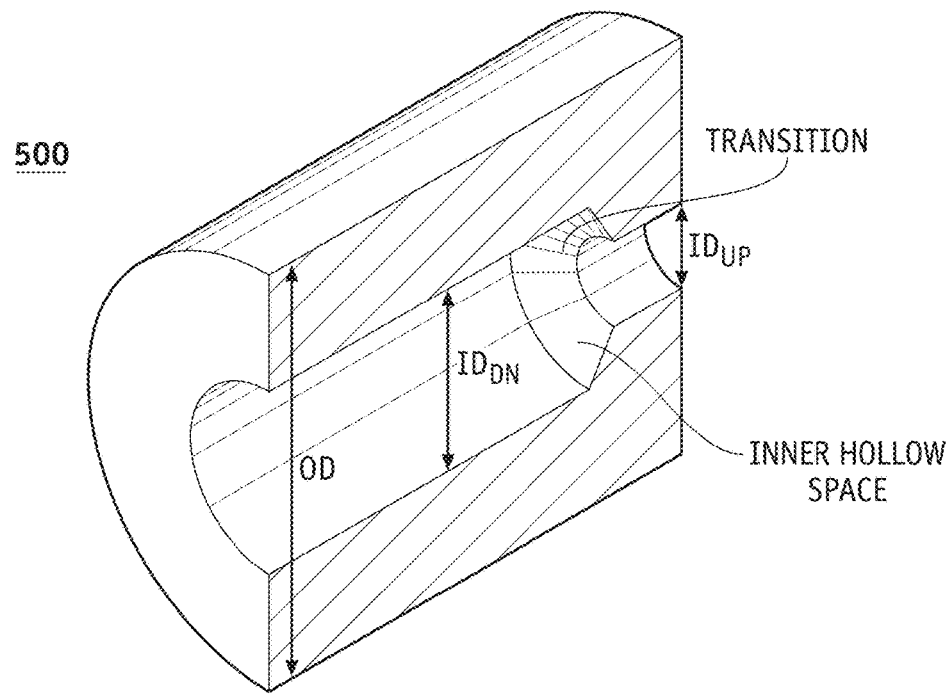
FIG. 5B shows an isometric view of the cross section of FIG. 5A.

As shown in FIG. 5A, as well as in the corresponding isometric view of the cross section shown in FIG. 5B, the varying cross section of the inner hollow space of the emitter (500) is provided by a transition region (labelled as Transition in FIGS. 5A-5B) having a varying inner diameter, from $ID_{UP}$ at one end of the transition region in the upstream direction, to $ID_{DN}$ at the other end of the transition region in the downstream direction. It should be noted that although the transition region may be defined by a chamfer (e.g., frustoconical, coned region) as shown in FIGS. 5A and 5B, other shapes may equally be used with similar effects on performance/operation of the emitter (500) when fitted in the cathode, such as for example a transition region having an inner diameter slope (i.e., rate of change of the inner diameter) that does not change linearly with respect to a longitudinal direction. It should be noted, that as used herein, the longitudinal direction, also referred to as axial direction, may be defined by a centerline (labelled as $C_L$ in FIG. 5A) passing through the center of the emitter inlet (defined by the smaller diameter $ID_{UP}$) and the center of the emitter outlet (defined by the larger diameter $ID_{DN}$). It follows that a longitudinal extension may be represented by a length in the longitudinal direction. According to some nonlimiting exemplary embodiments, the emitter (500) may be defined by symmetrical structures around the centerline. In other words, both the outer (cylindrical) shape and the inner hollow space of the emitter (500) may be symmetrical around the centerline.

As can be clearly taken from FIGS. 5A and 5B, the transition region (Transition) divides the inner hollow space of the emitter (500) into two separate cylindrical hollow spaces: a) an upstream region ($ID_{UP}$, $L_{UP}$), defined by a cylindrical hollow space having the smaller inner diameter ($ID_{UP}$) along its longitudinal extension (labelled as $L_{UP}$ in FIG. 5A), and b) a downstream region ($ID_{DN}$, $L_{DN}$) defined by a cylindrical hollow space having the larger inner diameter ($ID_{DN}$) along its longitudinal extension (labelled as $L_{DN}$ in FIG. 5A). Accordingly, the inner hollow space of the emitter (500) includes three separate (hollow) regions: the upstream region, the downstream region, and the transition region ($ID_{UP \leftrightarrow DN}$, $L_T$), latter defined by a varying diameter hollow space along its longitudinal extension (labelled as $L_T$ in FIG. 5A). As can be clearly seen in FIGS. 5A and 5B, the transition region connects the upstream region to the downstream region.

With continued reference to FIGS. 5A and 5B, the thermionic emitter (500) may be fabricated from known in the art thermionic material, such as, for example, the above-mentioned barium oxide impregnated porous tungsten (BaO—W) and lanthanum hexaboride ($LaB_6$). Other material with thermionic emission capability at (acceptable) temperatures of operation of the cathode may equally be used. It follows that the entirety of the upstream ($ID_{UP}$, $L_{UP}$), downstream ($ID_{DN}$, $L_{DN}$) and transition ($ID_{UP \leftrightarrow DN}$, $L_T$) regions of the emitter (500) are formed with a same (thermionic) material. Accordingly, the emitter inlet defined by the smaller inner diameter ($ID_{UP}$) at the upstream end of the emitter (500) is formed of a same material as the emitter outlet defined by the larger inner diameter ($ID_{DN}$) at the downstream end of the emitter (500).

According to an exemplary nonlimiting embodiment of the present disclosure, a ratio between the length ($L_{UP}$) and the smaller inner diameter ($ID_{UP}$) of the upstream region ($ID_{UP}$, $L_{UP}$) is larger than or equal to 1.5:1, and preferably larger than 2:1. Exemplary nonlimiting embodiments may be provided with ratios in a range of 1.5:1 to 2.5:1, such as, for example, in a range of 1.5:1 to 2:1, 2:1 to 3:1, or 2:1 and larger.

According to an exemplary nonlimiting embodiment of the present disclosure, a length ($L_T$) of the transition region ($ID_{UP \leftrightarrow DN}$, $L_T$) is smaller than the length ($L_{UP}$) of the upstream region ($ID_{UP}$, $L_{UP}$). Exemplary nonlimiting embodiments may be provided by ratios of $L_{UP}$ to $L_T$ in a range of 2:1 to 10:1.

According to an exemplary nonlimiting embodiment of the present disclosure, geometries of the emitter (500) shown in FIGS. 5A and 5B may be provided by: outer diameter (OD) equal to about 5 mm; overall length (L) equal to about 6 mm, larger inner diameter ($ID_{DN}$) equal to about 2 mm; smaller inner diameter ($ID_{UP}$) equal to about 0.8 mm; length ($L_{DN}$) equal to about 4.6 mm; and length ($L_{UP}$) equal to about 1.2 mm. It should be noted that the term "about" may be interpreted as +/−10%. Such specific geometries of the insert were chosen to provide 4 A (amperes) of discharge current with long lifetimes above 10,000 hours. A person skilled in the art would know how to scale such geometries for different values of discharge current and/or lifetimes. Furthermore, it should be noted that according to an exemplary embodiment of the present disclosure, the smaller inner diameter ($ID_{UP}$) may be in a range from about 0.5 mm to about 1.0 mm irrespective of a size of the larger inner diameter ($ID_{DN}$). According to some exemplary nonlimiting embodiments, a ratio between the larger inner diameter ($ID_{DN}$) and the smaller inner diameter ($ID_{UP}$) may be in a range of 2:1 to 4:1, such as, for example, in a range of 2:1 to 2.5:1, or larger than 2:1.

Figure 6:
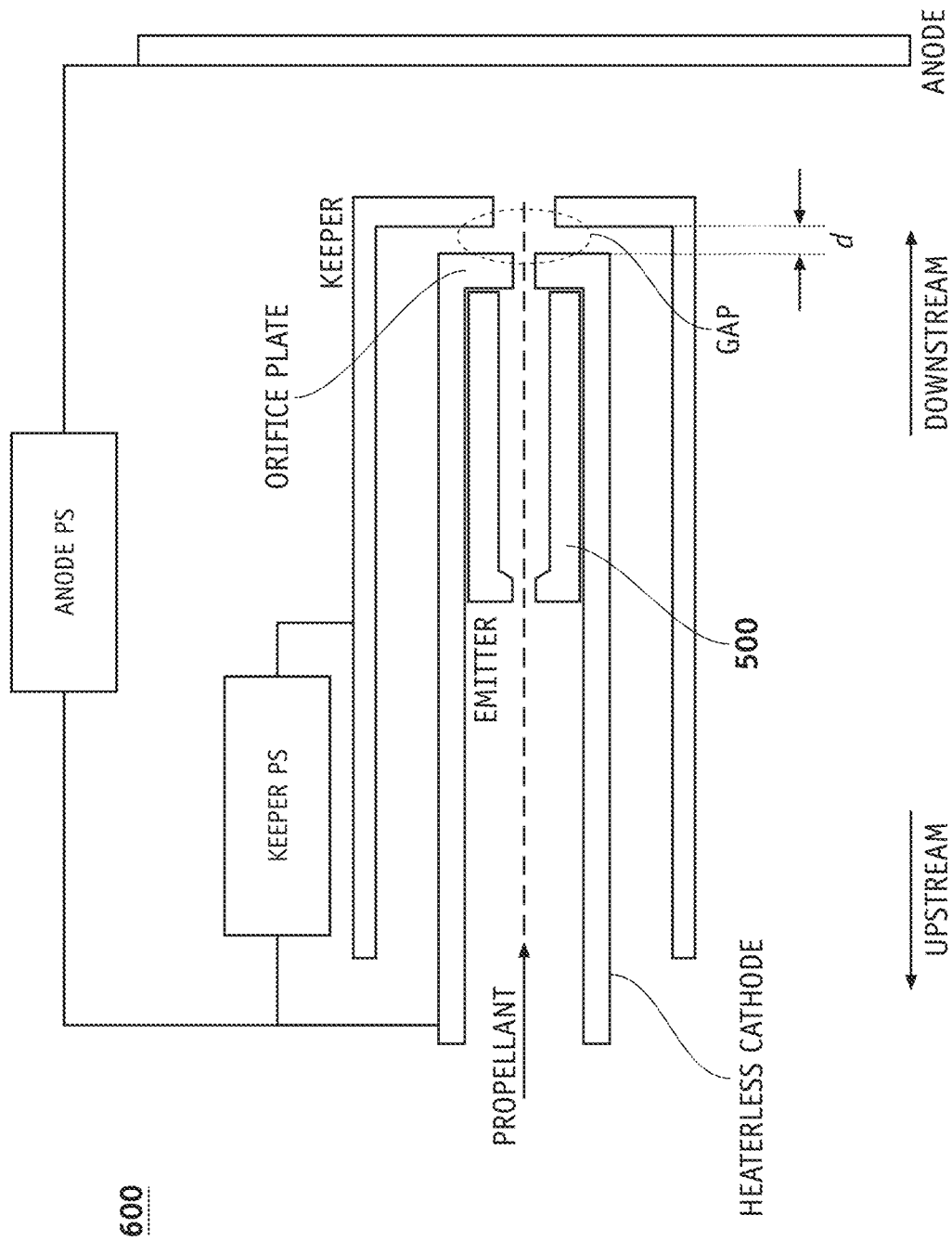
FIG. 6 shows a simplified schematic of an EP device including the heaterless hollow cathode according to the present disclosure.

FIG. 6 shows a simplified schematic of an EP device (600) including the heaterless hollow cathode (labelled in FIG. 6 as Heaterless Cathode) according to the present disclosure, comprising the thermionic emitter (500) described above with reference to FIGS. 5A and 5B. Principle of operation of the heaterless cathode shown in FIG. 6 is similar to the prior art configuration described above with reference to the FIG. 2, except lack of drawbacks associated with such prior art configuration by way of difference in geometries between the thermionic emitter (500) and the prior art thermionic emitter.

As previously noted, the geometry of the emitter (500) shown in FIG. 6 and described with reference to, for example, FIGS. 5A and 5B, including the constricted (orifice) geometry of the emitter inlet in the upstream region of the emitter (500) compared to the (orifice) geometry of the emitter outlet in the downstream region of the emitter (500), is designed to prevent the electric field generated between the cathode potential at the orifice plate/insert and the keeper potential from significantly penetrating further upstream into the upstream region (i.e., ($ID_{UP}$, $L_{UP}$) described above with reference to FIGS. 5A-5B) of the insert (500). Accordingly, such electric field may not travel further downstream the insert (500) into regions of, for example, the cathode tube and/or gas-feed line (e.g., per description of FIG. 4 above).

For example, in a case of a heaterless cathode with a +1 kV keeper bias, the constricted geometry of the emitter inlet according to the present teachings allows a potential penetration of less than 1 V upstream of the emitter (500). Such penetrated potential is two orders of magnitude lower than a potential required for a Paschen breakdown, thereby eliminating the possibility of field-emission arc attachment upstream of the emitter (500). Tests with the cathode according to the present teachings showed no penetration of the discharge upstream of the emitter (500). Inventors of the present disclosure believe that the Paschen discharge partially attaches directly to the emitter (500) and efficiently heats the emitter due to the very short (0.1 sec) ignition times observed with the geometry of the emitter (500) shown in FIGS. 5A and 5B.

Figure 2:
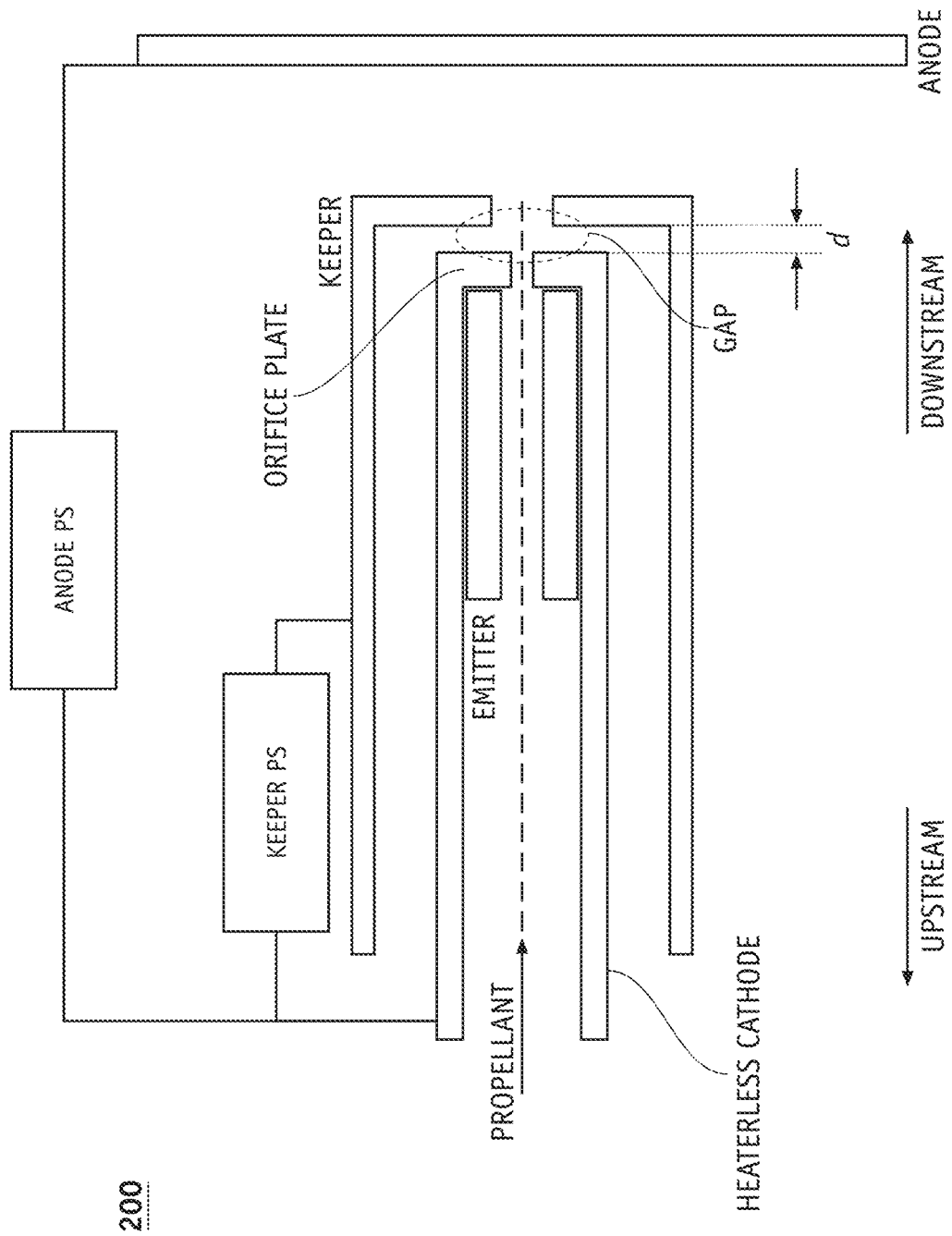
FIG. 2 shows a simplified electrical schematic of a prior art EP device including a heaterless hollow cathode having geometries based on the prior art hollow cathode of FIG. 1.
Figure 3:
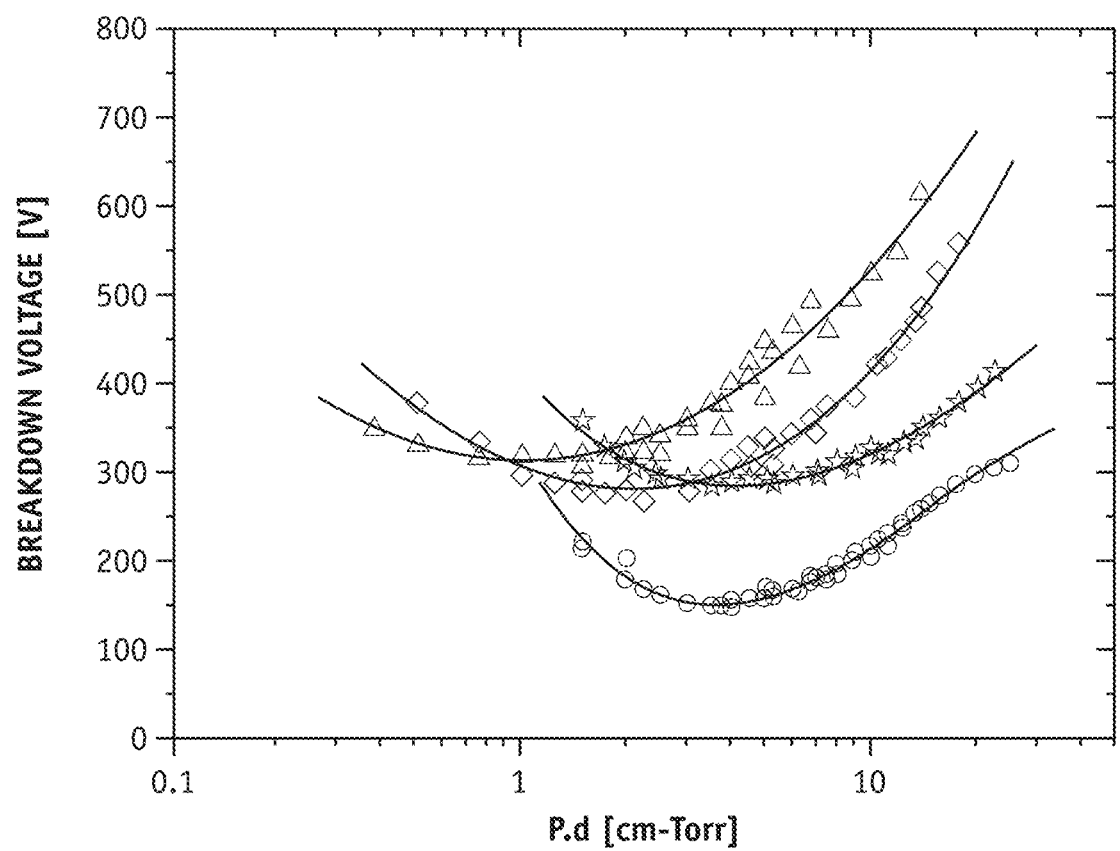
FIG. 3 shows curves representing exemplary Paschen breakdown voltages versus pressure-distance (P*d) product for different propellant gas.
Figure 7:
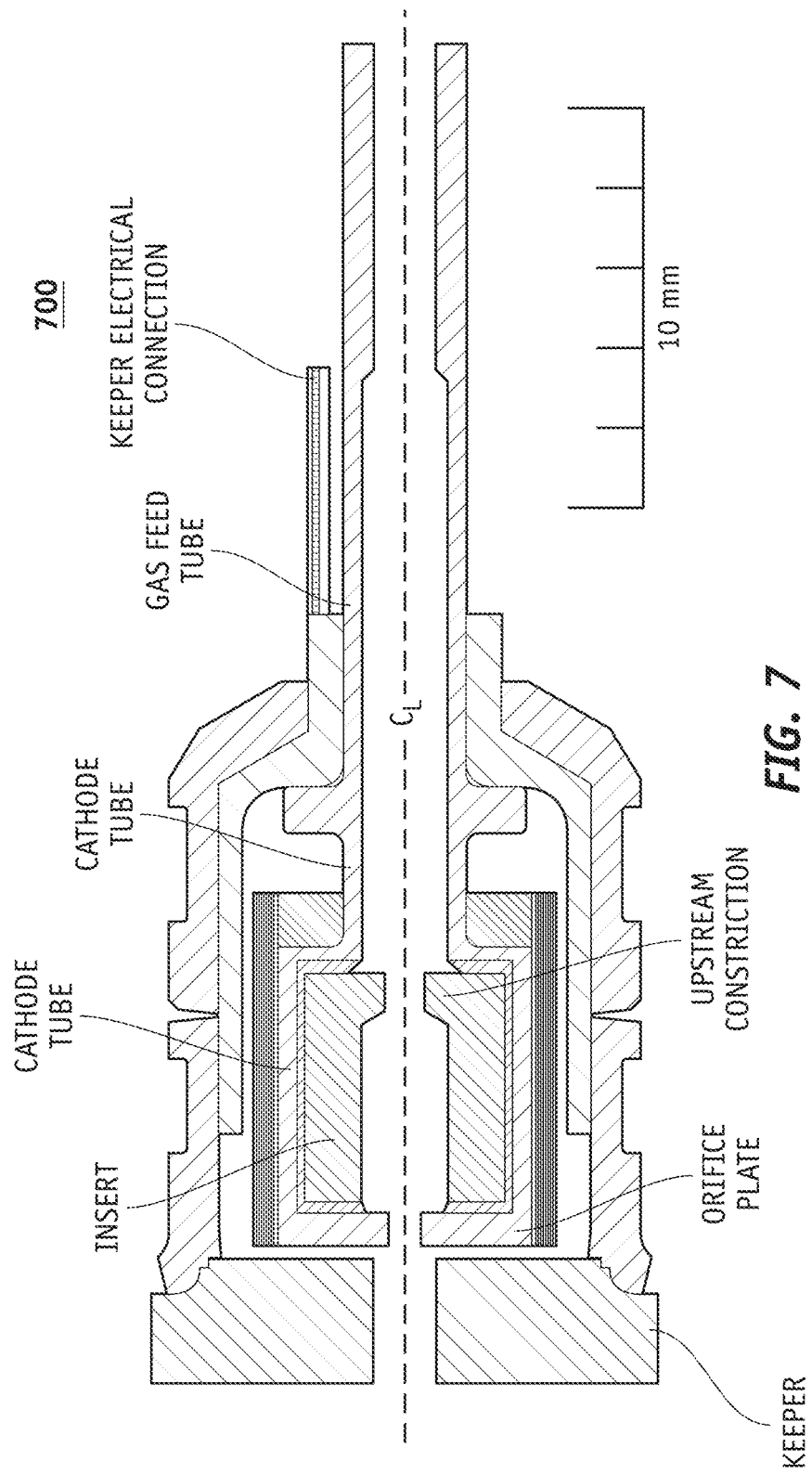
FIG. 7 shows a cross section of an actual implementation of a heaterless hollow cathode according to the present disclosure.

FIG. 7 shows a cross section of an actual implementation of a heaterless hollow cathode according to the present disclosure which may be likened to elements shown in FIG. 2. As shown in FIG. 7, elements of the heaterless hollow cathode being identified include the insert and its upstream constriction (e.g., $ID_{UP}$, $L_{UP}$ region identified in FIG. 5A), the cathode tube, the orifice plate, the keeper, the gas feed tube coupled to the cathode tube, and the keeper electrical connection.

Based on the above, process steps for a method according to the present teachings for reducing penetration of electric discharge, including Paschen discharge, upstream of a heaterless hollow cathode may include: designing a thermionic emitter having a constricted upstream (orifice) inlet compared to a downstream (orifice) outlet; fitting the thermionic insert into a downstream region of a cathode tube, thereby obtaining a heaterless hollow cathode; and based on the obtaining, operating an electric propulsion device via the heaterless hollow cathode with reduced electric discharge penetration upstream of the constricted upstream inlet.

The process step of operating of the electric propulsion device per the above method may further include the process steps: partially surrounding the heaterless hollow cathode with a keeper electrode; applying a potential difference between the heaterless hollow cathode and the keeper electrode; and based on the applying, generating an electric discharge that is confined to a downstream region of the heaterless hollow cathode, the electric discharge being a Paschen discharge.

The process step of operating the electric propulsion device per the above method may further include the process steps: flowing a propellant gas through the constricted upstream inlet towards the downstream outlet; and based on the generating of the electric discharge and the flowing; igniting the electric propulsion device.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A heaterless hollow cathode, comprising:
 a cathode tube having an inner cylindrical hollow space; and
 a thermionic emitter arranged in a downstream region of the inner cylindrical hollow space of the cathode tube, the thermionic emitter comprising:
  a first inner cylindrical hollow space having a first diameter that defines an upstream inlet orifice of the thermionic emitter; and
  a second inner cylindrical hollow space having a second diameter that defines a downstream outlet orifice of the thermionic emitter;
 wherein the first diameter is smaller than the second diameter.

2. The heaterless hollow cathode of claim 1, wherein:
 the first inner cylindrical hollow space has a first length along a longitudinal direction of the thermionic emitter,
 the second inner cylindrical hollow space has a second length along the longitudinal direction, and
 the first length is smaller than the second length.

3. The heaterless hollow cathode of claim 1, wherein:
 a ratio between the second diameter and the first diameter is larger than, or equal to, 2:1.

4. The heaterless hollow cathode of claim 3, wherein:
 the ratio between the second diameter and the first diameter is in a range from 2:1 to 4:1.

5. The heaterless hollow cathode of claim 4, wherein:
 the ratio between the second diameter and the first diameter is in a range from 2:1 to 2.5:1.

6. The heaterless hollow cathode of claim 2, wherein:
 a ratio between the first length and the first diameter is larger than, or equal to, 1.5:1.

7. The heaterless hollow cathode of claim 6, wherein:
 the ratio between the first length and the first diameter is in a range from 1.5:1 to 2.5:1.

8. The heaterless hollow cathode of claim 7, wherein:
 the ratio between the first length and the first diameter is in a range from 1.5:1 to 2:1.

9. The heaterless hollow cathode of claim 2, wherein:
 an overall length of the thermionic emitter is about 6 mm,
 an outer diameter of thermionic emitter is about 5 mm,
 the first length is about 1.2 mm,
 the second length is about 4.6 mm,
 the first diameter is about 0.8 mm, and
 the second diameter is about 2 mm.

10. The heaterless hollow cathode of claim 1, further comprising:
 a transition inner hollow space arranged between the first inner cylindrical hollow space and the second inner cylindrical hollow space,
 wherein the transition inner hollow space includes a variable diameter along a longitudinal direction of the thermionic emitter.

11. The heaterless hollow cathode of claim 10, wherein:
 a diameter at an upstream end of the transition inner hollow space is equal to the first diameter, and
 a diameter at a downstream end of the transition inner hollow space is equal to the second diameter.

12. The heaterless hollow cathode of claim 11, wherein:
 a diameter of the transition inner hollow space along the longitudinal direction varies linearly between the first diameter at the upstream end and the second diameter at the downstream end.

13. The heaterless hollow cathode of claim 11, wherein:
a diameter of the transition inner hollow space along the longitudinal direction varies nonlinearly between the first diameter at the upstream end and the second diameter at the downstream end.

14. The heaterless hollow cathode of claim 11, wherein:
the transition inner cylindrical hollow space has a transition length along the longitudinal direction,
the first inner cylindrical hollow space has a first length along the longitudinal direction, and
the transition length is smaller than the first length.

15. The heaterless hollow cathode of claim 14, wherein:
a ratio between the first length and the transition length is larger than, or equal to, 2:1.

16. The heaterless hollow cathode of claim 15, wherein:
the ratio between the first length and the transition length is in a range from 2:1 to 10:1.

17. The heaterless hollow cathode of claim 15, wherein:
the thermionic emitter is fabricated from a material comprising: a) barium oxide impregnated porous tungsten (BaO—W), or b) lanthanum hexaboride ($LaB_6$), or c) a thermionic material capable of supplying electron current at elevated temperatures.

18. An electric propulsion device comprising:
a heaterless hollow cathode according to claim 1,
wherein the electric propulsion device is gridded ion thruster or a Hall thruster.

19. A thermionic emitter, comprising:
a first inner cylindrical hollow space having a first diameter that defines an upstream inlet orifice of the thermionic emitter;
a second inner cylindrical hollow space having a second diameter that defines a downstream outlet orifice of the thermionic emitter; and
a transition inner hollow space arranged between the first inner cylindrical hollow space and the second inner cylindrical hollow space,
wherein
the first diameter is smaller than the second diameter,
a ratio of the first diameter to the second diameter is configured to reduce upstream penetration of electric fields when the thermionic emitter is arranged in a downstream region of a heaterless hollow cathode of a thruster, and
at a temperature range of about 1200 to 1500 degrees Celsius, the thermionic emitter is configured to produce, via thermionic emission, sufficient electrons for operation of the thruster.

20. A method for reducing penetration of electric discharge upstream of a heaterless hollow cathode, the method comprising:
providing a thermionic emitter having a constricted upstream inlet orifice compared to a downstream outlet orifice;
fitting the thermionic insert into a downstream region of a cathode tube, thereby obtaining a heaterless hollow cathode;
partially surrounding the heaterless hollow cathode with a keeper electrode;
applying a potential difference between the heaterless hollow cathode and the keeper electrode; and
based on the applying, generating an electric discharge that is confined to a downstream region of the heaterless hollow cathode, the electric discharge being a Paschen discharge.

21. A heaterless hollow cathode, comprising:
a cathode tube having an inner cylindrical hollow space, the cathode tube comprising an upstream opening for receiving a propellant; and
a thermionic emitter arranged in the inner cylindrical hollow space of the cathode tube, the thermionic emitter comprising:
a first inner cylindrical hollow space having a first diameter that defines an upstream inlet orifice of the thermionic emitter, the upstream inlet orifice located downstream of the upstream opening of the cathode tube; and
a second inner cylindrical hollow space having a second diameter that defines a downstream outlet orifice of the thermionic emitter;
wherein the first diameter is smaller than the second diameter.

22. The heaterless hollow cathode of claim 21, wherein:
the downstream outlet orifice of the thermonic emitter is located at a downstream opening of the cathode tube.

* * * * *